US012472876B2

(12) United States Patent
Son et al.

(10) Patent No.: US 12,472,876 B2
(45) Date of Patent: Nov. 18, 2025

(54) SLIDING TRANSPORT APPARATUS OF STORAGE PORTION FOR VEHICLE (71) Applicant: KBI DONGKOOK IND. CO., LTD., Seoul (KR)

(72) Inventors: Dong Il Son, Ulsan (KR); Dong Yong Choi, Gyeonggi-do (KR); Chang Bok Park, Ulsan (KR); Sun Kyung Kim, Ulsan (KR)

(73) Assignee: KBI Dongkook IND Co. LTD., Seoul (KR)

( * ) Notice: Subject to any disclaimer, the term of this patent is extended or adjusted under 35 U.S.C. 154(b) by 129 days.

(21) Appl. No.: 18/327,301

(22) Filed: Jun. 1, 2023

(65) Prior Publication Data

US 2023/0311777 A1 Oct. 5, 2023

Related U.S. Application Data (63) Continuation of application No. PCT/KR2022/015294, filed on Oct. 11, 2022.

(30) Foreign Application Priority Data

Oct. 18, 2021 (KR) .......................... 10-2021-0138390
May 4, 2022 (KR) .......................... 10-2022-0055387

(51) Int. Cl.
*B60R 7/04* (2006.01)
*B60R 11/00* (2006.01)

(52) U.S. Cl.
CPC ................ *B60R 7/04* (2013.01); *B60R 11/00* (2013.01); *B60R 2011/008* (2013.01); *B60R 2011/0084* (2013.01)

(58) Field of Classification Search
CPC ..... B60R 7/04; B60R 7/06; B60R 2011/0084; F16C 29/005; A47B 88/487
(Continued)

(56) References Cited

U.S. PATENT DOCUMENTS 5,046,861 A * 9/1991 Tarver .................... A47B 88/42
384/23
6,135,529 A * 10/2000 De Angelis ............... B60R 7/04
224/281
(Continued)

FOREIGN PATENT DOCUMENTS

CN 210033237 Y 2/2020
JP 10-329612 A 12/1998
(Continued)

OTHER PUBLICATIONS

Korean Office Action dated Aug. 19, 2024 for corresponding Korean Application No. 10-2024-0098700 and English translation.
(Continued)

*Primary Examiner* — Justin M Larson
(74) *Attorney, Agent, or Firm* — Eschweiler & Potashnik, LLC; Harris Kim (57) ABSTRACT

Sliding transport apparatus of a storage portion for a vehicle. The sliding transport apparatus includes a fixed frame provided such that the fixed frame is stationary in a vehicle interior space, a movable frame configured to be movable along a longitudinal direction of the fixed frame while being accommodated in an inner side space formed by the fixed frame, the movable frame having an upper portion on which the storage portion is mounted, and a stopper provided detachably on the fixed frame, the stopper being inserted into a guide long hole formed in the movable frame, thereby limiting a movement distance of the movable frame.

6 Claims, 11 Drawing Sheets

(58) Field of Classification Search
USPC ............ 224/281, 554; 296/37.12, 37.8, 37.1, 296/24.34; 248/429; 384/7, 21
See application file for complete search history.

(56) References Cited

U.S. PATENT DOCUMENTS

| | | | | |
|---|---|---|---|---|
| 6,305,739 | B1 * | 10/2001 | Corona | B60P 3/34 296/165 |
| 6,382,480 | B1 * | 5/2002 | Egly | B60R 5/00 224/310 |
| 6,655,561 | B2 * | 12/2003 | Panhelleux | B60N 2/793 224/281 |
| 7,066,521 | B2 * | 6/2006 | Jung | B60N 2/0705 296/65.13 |
| 7,077,468 | B2 * | 7/2006 | Maierholzner | B60N 2/773 220/348 |
| 7,234,747 | B2 * | 6/2007 | Rasmussen | B60P 3/34 296/165 |
| 7,591,498 | B2 * | 9/2009 | Busha | B60N 3/101 224/281 |
| 8,235,442 | B2 * | 8/2012 | Spitler | B60R 7/04 296/37.8 |
| 8,267,581 | B2 * | 9/2012 | Li | G06F 1/1624 384/7 |
| 8,534,733 | B2 * | 9/2013 | Schreurs | B60N 2/02 296/1.09 |
| 8,585,150 | B2 * | 11/2013 | von Rothkirch Und Panthen | F16C 29/123 297/411.21 |
| 9,657,772 | B2 * | 5/2017 | Bozio | F16C 29/02 |
| 9,776,539 | B2 * | 10/2017 | Lee | B60N 2/773 |
| 11,667,243 | B2 * | 6/2023 | Son | B60R 7/06 296/37.12 |
| 11,958,440 | B2 * | 4/2024 | Chen | B60R 7/04 |
| 2010/0008606 | A1 * | 1/2010 | Craddock | B60N 2/773 384/26 |
| 2015/0258923 | A1 * | 9/2015 | Skapof | B60R 7/04 296/24.34 |
| 2023/0084592 | A1 * | 3/2023 | Son | B60R 7/04 296/24.34 |
| 2023/0311777 | A1 * | 10/2023 | Son | B60R 7/04 296/24.3 |
| 2023/0356663 | A1 * | 11/2023 | Son | B60R 7/04 |

FOREIGN PATENT DOCUMENTS

| | | |
|---|---|---|
| JP | 2000-264132 A | 9/2000 |
| JP | 2009-006737 A | 1/2009 |
| JP | 2012-126183 A | 7/2012 |
| JP | 2014-058272 A | 4/2014 |
| KR | 20-1998-0064592 A | 11/1998 |
| KR | 10-2005-0045430 A | 5/2005 |
| KR | 10-2010-0105923 A | 10/2010 |
| KR | 10-2019-0053448 A | 5/2019 |

OTHER PUBLICATIONS

Korean Office Action dated Aug. 19, 2024 for corresponding Korean Application No. 10-2024-0098701 and English translation.
International Search Report for corresponding International Application No. PCT/KR2022/015294 mailed Jan. 16, 2023.
Written Opinion for corresponding International Application No. PCT/KR2022/015294 dated Jan. 16, 2023.
Office Action dated Nov. 29, 2023 for corresponding Korean Application No. 10-2022-0055387 and English translation.
European Extended Search Report dated Jul. 29, 2025 in connection with Application No. EP22883848.8.

* cited by examiner

SLIDING TRANSPORT APPARATUS OF STORAGE PORTION FOR VEHICLE

CROSS REFERENCE TO RELATED APPLICATION

This is a continuation of International Application No. PCT/KR2022/015294 filed on Oct. 11, 2022, which claims priority from Korean Patent Application No. 10-2021-0138390 filed on Oct. 18, 2021 and Korean Patent Application No. 10-2022-0055387 filed on May 4, 2022. The contents of these applications are incorporated herein by reference in their entireties.

TECHNICAL FIELD

The present disclosure relates to a sliding transport apparatus for a storage portion of a vehicle. More particularly, the present disclosure relates to a sliding transport apparatus a storage portion of a vehicle, the sliding transport apparatus being applied in a glove box, a console box, or a withdrawal tray provided inside the vehicle and being configured such that the storage portion or the tray can be slidably transported by a user without up and down direction movements or left and right direction movements.

BACKGROUND

Generally, a console box, a glove box, an overhead box, and so on for storing items are provided in an interior of a vehicle.

In a storage space formed by such boxes, items used in the interior of the vehicle are stored, and the boxes are mounted such that the boxes are capable of being opened and closed for the convenience of a user. For example, the glove box is mounted on a dashboard disposed in the front of a passenger seat of the vehicle such that the glove box is capable of being opened and closed, and the console box is mounted between a driver seat and the passenger seat such that the console box is capable of being opened and closed.

As a recent trend for a vehicle to be equipped with an autonomous driving system, utilization of an interior space of a vehicle is becoming important. In addition, since a battery pack using electric energy or hydrogen energy is used as a driving power source instead of an existing internal combustion engine, an interior space of a vehicle is expanded as the number of internal components of the vehicle decreases.

Therefore, a method of expanding a space in which items can be stored by changing a glove box or a console box in a hinged type to a glove box or a console box in a sliding type is researched, and a method of changing a position of a seat so that a driver or a passenger can perform various activities other than driving in an interior of a vehicle is being researched.

Particularly, a conventional console box provided in the vehicle is disposed between a driver seat and a passenger seat while being in a state in which the console box is fixed and mounted at a vehicle body, and has an important role in forming a space at a front seat side. Therefore, as a range of autonomous driving expands, it is required to increase space utilization by configuring a console box to be movable. Particularly, research and development of an operating mechanism for a user to easily and quickly move a console box in a vehicle interior space is required.

However, in slidably moving a glove box or a console box in a rectilinear direction, a situation in which a storage portion is moved in a height direction (up and down directions) or a width direction (left and right directions) occurs, and there is a problem that noise is caused accordingly.

Accordingly, the present applicant has proposed the present disclosure in order to solve these problems as described above, and Korean Patent Application Publication No. 10-2005-0045430 'CONSOLE BOX OF AUTOMOBILE' as relevant conventional technology literature has been disclosed.

BRIEF SUMMARY

Accordingly, the present disclosure has been made keeping in mind the above problems occurring in the related art, and an objective of the present disclosure is to provide a sliding transport apparatus for a storage portion of a vehicle, the sliding transport apparatus being configured to prevent up and down direction movements or left and right direction movements of the storage portion and to stably and easily transport the storage portion when a user slidably opens or closes the storage portion that is provided in a vehicle interior space.

In order to achieve the above objective, according to the present disclosure, there is provided a sliding transport apparatus for a storage portion of a vehicle. The sliding transport apparatus includes a fixed frame provided such that the fixed frame is stationary in a vehicle interior space; a movable frame configured to be movable along a longitudinal direction of the fixed frame while being accommodated in an inner side space formed by the fixed frame, the movable frame having an upper portion on which the storage portion is mounted; and a stopper provided detachably on the fixed frame, the stopper being inserted into a guide long hole formed in the movable frame, thereby limiting a movement distance of the movable frame.

In addition, the fixed frame may include: a floor member provided such that the floor member is stationary in the vehicle interior space; a first vertical member that protrudes vertically upward from opposite sides in a width direction of the floor member, the first vertical member having a rail groove in which a first caster provided on the movable frame is capable of being accommodated; and a second vertical member including a pair of second vertical members which is disposed to be spaced apart from each other by a predetermined distance and which protrudes vertically upward on an upper surface of the floor member, the second vertical member on which a second caster in rolling contact with a bottom portion of the movable frame is rotatably provided.

In addition, the movable frame may include: an upper plate member on which the storage portion is mounted and in which the guide long hole is formed; a third vertical member which protrudes vertically downward from opposite sides in a width direction of the upper plate member and which is disposed so as to face the first vertical member, the third vertical member on which the first caster capable of being moved along the rail groove is mounted; a fourth vertical member which protrudes vertically downward from a bottom portion of the upper plate member and which is disposed between the third vertical member and the second vertical member; and a guide member which protrudes vertically downward from a center of the bottom portion of the upper plate member and which is disposed between the pair of second vertical members.

In addition, the sliding transport apparatus may further include an auxiliary caster rotatably provided in a space formed between the third vertical member and the fourth vertical member, the auxiliary caster being in rolling contact with the upper surface of the floor member of the fixed frame.

In addition, a pair of guide casters may be disposed between a space formed between the pair of second vertical members, and the pair of guide casters may be in rolling contact with guide surfaces that protrude laterally from a lower end portion of the guide member.

In addition, the stopper may include: a plate mounted on a bottom surface of the floor member; an insertion member that protrudes upward from an upper surface of the plate, the insertion member being inserted into the guide long hole; and a buffer member having a through-hole into which the insertion member is capable of being inserted, the buffer member surrounding a circumferential portion of the insertion member.

In addition, a plurality of opening portions disposed so as to be spaced apart from each other by a predetermined distance may be formed in the floor member along a longitudinal direction of the floor member, and the plate of the stopper may be provided on the floor member while blocking any one of the plurality of opening portions among the plurality of opening portions.

In the sliding transport apparatus of the storage portion for the vehicle according to the present disclosure, since a structural configuration in which the storage portion provided in the interior space of the vehicle is slidably moved and opened is provided, a space in which items can be stored may be increased, and space utilization may be increased as the interior space of the vehicle is expanded.

In addition, in the sliding transport apparatus of the storage portion for the vehicle according to the present disclosure, the sliding movement distance of the movable frame may be optionally set in consideration of a size of the interior space of the vehicle, a volume of the storage portion, and so on.

In addition, in the sliding transport apparatus of the storage portion for the vehicle according to the present disclosure, a shock that occurs on the movable frame during a process in which the storage portion is slidably moved and stopped may be prevented.

In addition, in the sliding transport apparatus of the storage portion for the vehicle according to the present disclosure, since a structural configuration preventing a situation in which the movable frame is moved in the left and right directions is provided, a situation in which the storage portion is unintentionally shaken during the driving process of the vehicle or during a user's operation may be prevented.

DETAILED DESCRIPTION

Advantages and features of the present disclosure, and methods of achieving the same will become apparent with reference to the embodiments described below in detail in conjunction with the accompanying drawings.

However, the present disclosure is not limited to the embodiments disclosed below, but may be implemented in various different forms. The present embodiments are intended to complete the disclosure of the present disclosure and provided to fully inform the skilled in the art to which the disclosure pertains of the scope of the disclosure. The disclosure is defined only by the scope of the claims.

Hereinafter, a sliding transport apparatus of a storage portion for a vehicle according to an embodiment of the present disclosure will be described in detail with reference to FIGS. 1 to 7. In a description of the present disclosure, a detailed description on the related known functions or structural configurations will be omitted to avoid making the essence of the present disclosure unclear.

Figure 1:
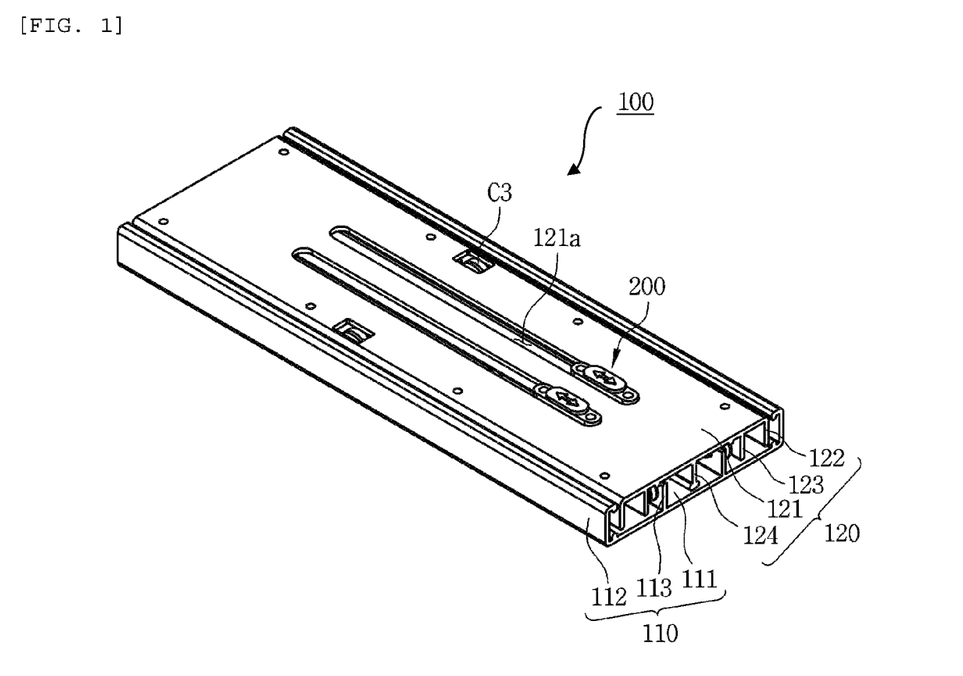
FIG. 1 is a perspective view illustrating a sliding transport apparatus of a storage portion for a vehicle according to an embodiment of the present disclosure.
Figure 2:
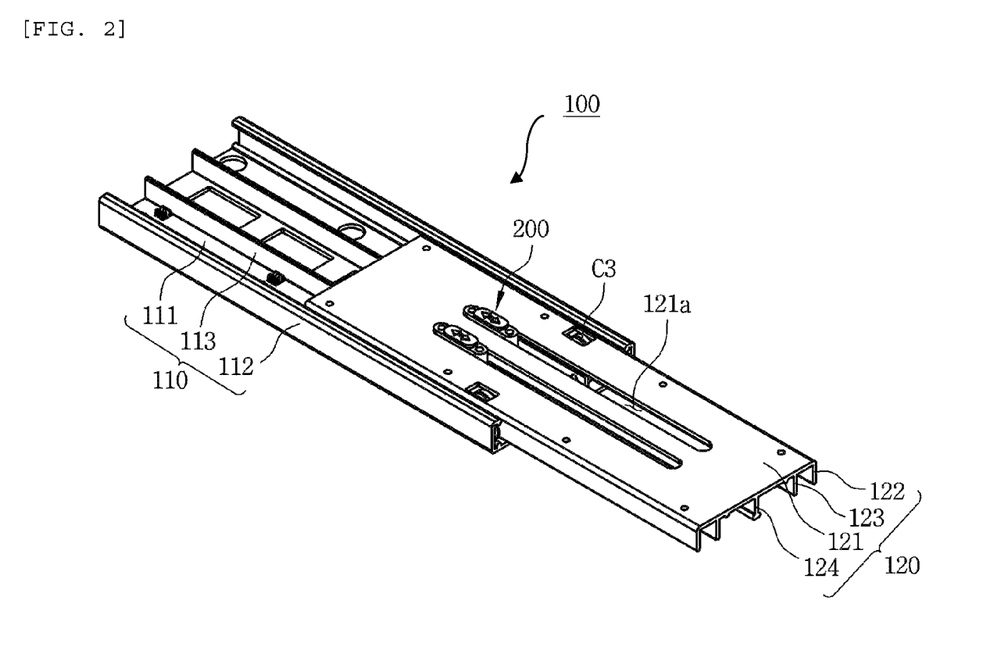
FIG. 2 is a perspective view illustrating a state in which a movable frame illustrated in FIG. 1 is slidably moved forward.
Figure 3:
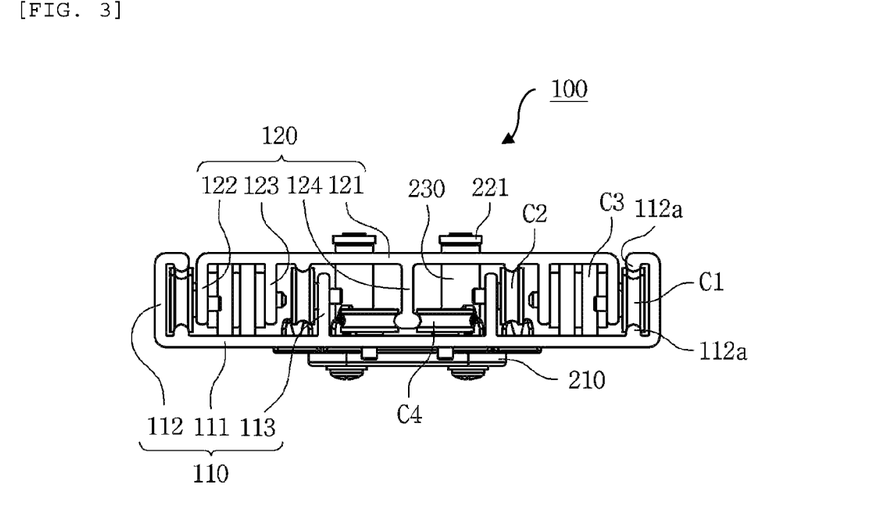
FIG. 3 is a front view illustrating the sliding transport apparatus of the storage portion for the vehicle illustrated in FIG. 1.
Figure 4:
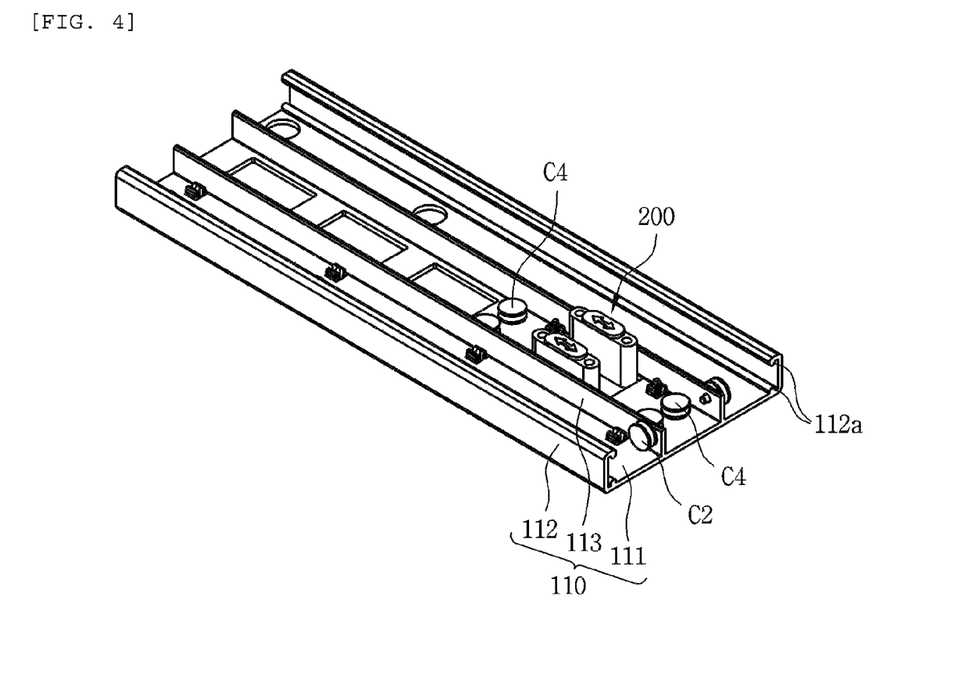
FIG. 4 is a perspective view illustrating a structural configuration of a fixed frame according to an embodiment of the present disclosure.
Figure 5:
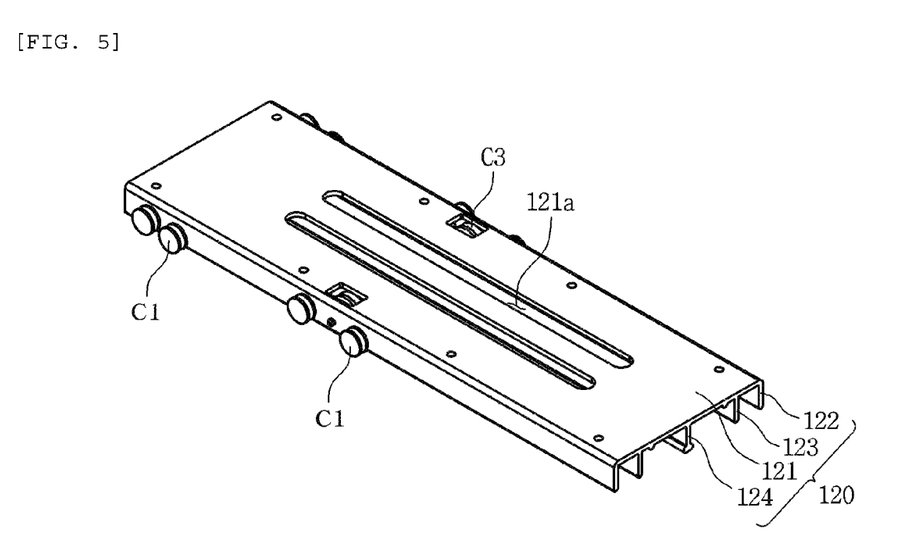
FIG. 5 is a perspective view illustrating a structural configuration of the movable frame according to an embodiment of the present disclosure.
Figure 6:
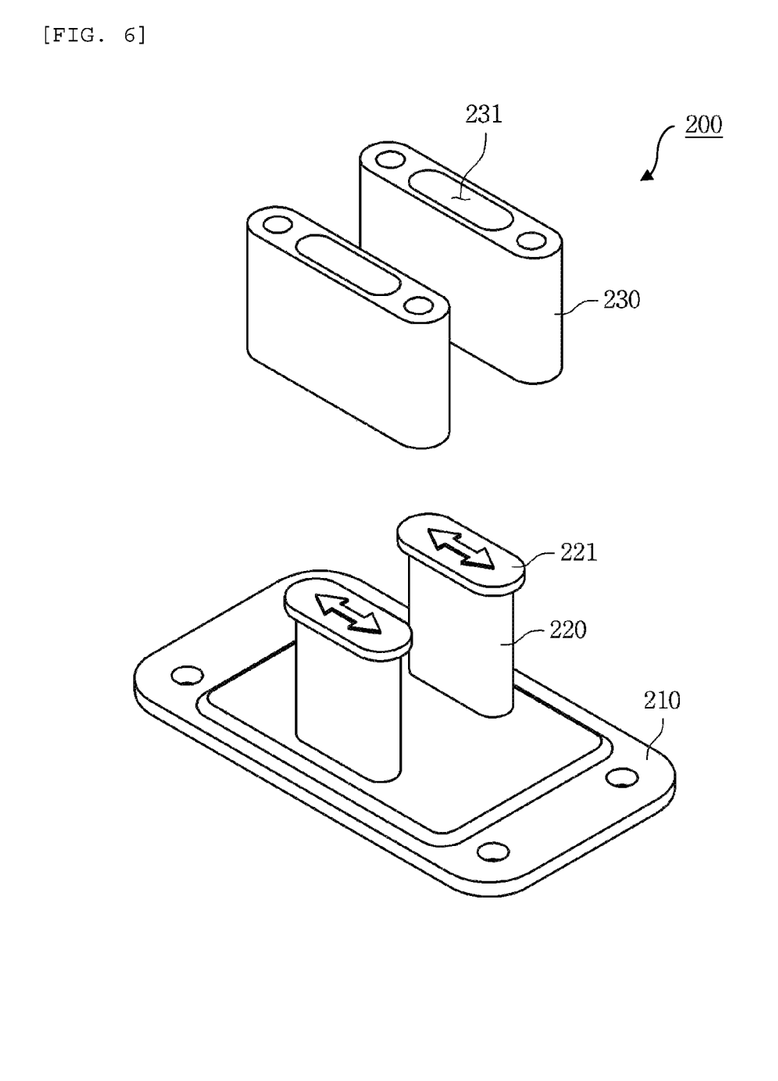
FIG. 6 is an exploded perspective view illustrating a structural configuration of a stopper according to an embodiment of the present disclosure.
Figure 7:
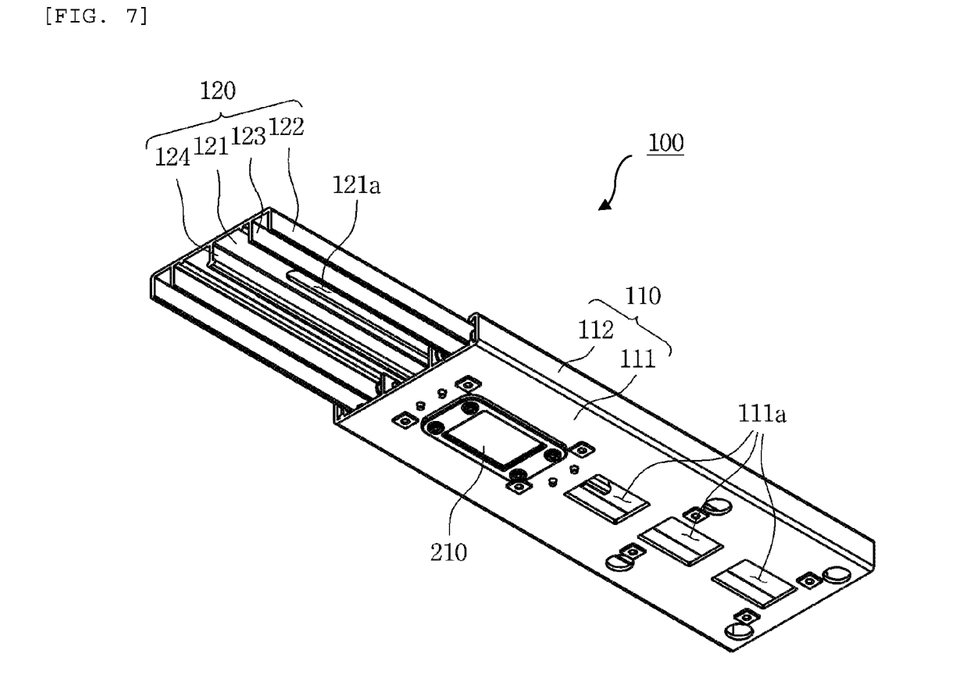
FIG. 7 is a perspective view illustrating the bottom portion of the sliding transport apparatus illustrated in FIG. 2.

FIG. 1 is a perspective view illustrating a sliding transport apparatus of a storage portion for a vehicle according to an embodiment of the present disclosure, FIG. 2 is a perspective view illustrating a state in which a movable frame illustrated in FIG. 1 is slidably moved forward, FIG. 3 is a front view illustrating the sliding transport apparatus of the storage portion for the vehicle illustrated in FIG. 1, FIG. 4 is a perspective view illustrating a structural configuration of a fixed frame according to an embodiment of the present disclosure, FIG. 5 is a perspective view illustrating a structural configuration of the movable frame according to an embodiment of the present disclosure, FIG. 6 is an exploded perspective view illustrating a structural configuration of a stopper according to an embodiment of the present disclosure, and FIG. 7 is a perspective view illustrating the bottom portion of the sliding transport apparatus illustrated in FIG. 2.

As illustrated in FIG. 1 and FIG. 2, a sliding transport apparatus 100 of a storage portion for a vehicle according to an embodiment of the present disclosure may include: a fixed frame 110 provided such that the fixed frame 110 is stationary in a vehicle interior space; a movable frame 120 accommodated in an inner side space formed by the fixed frame 110, the movable frame 120 being configured to be movable along a longitudinal direction of the fixed frame 110 and having an upper portion on which the storage portion (not illustrated) is mounted; and a stopper 200 provided detachably on the fixed frame 110, the stopper 200 being inserted into a guide long hole 121a formed in the movable frame 120, thereby limiting a movement distance of the movable frame 120.

The fixed frame 110 is a component which is mounted inside the vehicle and has a predetermined length and a predetermined width, and may be manufactured by an extrusion method.

As illustrated in FIG. 3 and FIG. 4, the fixed frame 110 may include: a floor member 111 provided such that the floor member 111 is stationary in the vehicle interior space; a first vertical member 112 that protrudes vertically upward from opposite sides in a width direction of the floor member 111, the first vertical member 112 having a rail groove in which a first caster C1 provided on the movable frame 120 is capable of being accommodated; and a pair of second vertical members 113 which is disposed to be spaced apart from each other by a predetermined distance and which protrudes in a vertical direction on an upper surface of the floor member 111, the pair of second vertical members 113 on which a second caster C2 in rolling contact with a bottom portion of the movable frame 120 is rotatably provided.

The floor member 111 may be mounted between a driver seat and a passenger seat, or may be mounted at a dashboard that is disposed in the front of the vehicle's interior space.

The first vertical member 112 is provided along an entire of the longitudinal direction of the floor member 111 from end portions in the width direction of the floor member 111. The first vertical member 112 provides a space in which the first caster C1 is capable of being moved in a rectilinear direction. Meanwhile, in the first vertical member 112, a guide protrusion 112a in rolling contact with the first caster C1 is provided along a longitudinal direction of the floor member 111.

The pair of second vertical members 113 is configured to reinforce the rigidity of the floor member 111, and is also configured to provide a space where the second caster C2 is capable of being rotatably mounted.

The second vertical member 113 is also provided along the longitudinal direction of the floor member 111. In addition, the second caster C2 may be rotatably mounted on a part in the longitudinal direction of the second vertical member 113. At this time, the second caster C2 is not in contact with the floor member 111.

In an embodiment of the present disclosure, it is illustrated in drawings that the second caster C2 is rotatably mounted on the first end side in the longitudinal direction of the second vertical member 113, but there is no limitation. For example, the second caster C2 may be rotatably mounted on the middle part in the longitudinal direction of the second vertical member 113 or on the second end part in the longitudinal direction of the second vertical member 113.

The movable frame 120 is also a component which has a predetermined length and a predetermined width and which is mounted inside the vehicle, and may be manufactured by an extrusion method.

As illustrated in FIG. 3 and FIG. 5, the movable frame 120 may include: an upper plate member 121 on which the storage portion is mounted on an upper surface thereof and in which the guide long hole 121a is formed; a third vertical member 122 which protrudes vertically downward from opposite sides in a width direction of the upper plate member 121 and which is disposed so as to face the first vertical member 112, the third vertical member 122 on which the first caster C1 capable of being moved along the rail groove formed along the first vertical member 112 is rotatably mounted; a fourth vertical member 123 which protrudes vertically downward from a bottom portion of the upper plate member 121 and which is disposed between the third vertical member 122 and the second vertical member 113; and a guide member 124 which protrudes vertically downward from a center of the bottom portion of the upper plate member 121 and which is disposed between the pair of second vertical members 113.

The upper plate member 121 is a component that is coupled to the storage portion, and has an area capable of supporting the storage portion.

The upper plate member 121 may be disposed so as to face the floor member 111, and may be disposed in a space having a 'U' shape formed by combining the floor member 111 and the first vertical member 112.

The guide long hole 121a formed in the upper plate member 121 is formed along a longitudinal direction of the upper plate member 121. In an embodiment of the present disclosure, a pair of guide long holes 121a spaced apart from each other by a predetermined distance is formed in a center portion of the upper plate member 121.

The third vertical member 122 is formed on the end portions in the width direction of the upper plate member 121 along the longitudinal direction of the upper plate member 121, and is disposed so as to face the first vertical member 112 while being spaced apart from the first vertical member 112 by a predetermined distance.

Preferably, the first caster C1 rotatably mounted on the third vertical member 122 is provided on a middle part or a second end part in a longitudinal direction of the third vertical member 122. This is to prevent the first caster C1 mounted on the third vertical member 122 from being exposed to the outside when the movable frame 120 is slidably moved on the fixed frame 110 and is withdrawn as illustrated in FIG. 2.

That is, when a user pulls a handle provided on the storage portion and slidably moves the upper plate member 121 as illustrated in FIG. 2, a first end portion in the longitudinal direction of the third vertical member 122 is exposed to the outside on the fixed frame 110. Therefore, when the first caster C1 is disposed on the exposed portion, there are problems that aesthetic appearance of the vehicle interior space is reduced and noise is caused while the exposed first caster C1 is rotated for a predetermined period of time.

Therefore, preferably, the first caster C1 is provided on the middle part or the second end part in the longitudinal direction of the third vertical member 122 where the fixed frame 110 is not exposed to the outside when the movable frame 120 is slidably moved on the fixed frame 110 and is maximally withdrawn as illustrated in FIG. 2 and FIG. 5.

In addition, a plurality of first casters C1 provided on the third vertical member 122 is in rolling contact with any one guide protrusion 112a among a pair of guide protrusions 112a formed on the first inclined member 112.

That is, as illustrated in FIG. 3 and FIG. 5, among the plurality of first casters C1 provided on the third vertical member 122, any one first caster C1 may be in rolling contact with the guide protrusion 112a disposed on an upper portion of the first vertical member 112, and another first rail caster C1 disposed on a first side of the first vertical member 112 may be in rolling contact with the guide protrusion 112a disposed on a lower portion of the first vertical member 112.

In an embodiment of the present disclosure, four first rail casters C provided on the third inclined member 122 may be disposed on different heights such that two first rail casters C are in rolling contact with the guide protrusion 112a disposed on the upper portion of the first vertical member 112 and the remaining two first rail casters C are in rolling contact with the guide protrusion 112a disposed on the lower portion of the first vertical member 112.

As such, since the plurality of first rail casters C is in selectively and alternately in rolling contact with the guide protrusions 112a disposed on the upper portion and the lower portion of the first vertical member 112, a rolling frictional force generated on the first rail casters C may be reduced and, accordingly, the movable frame 120 may be rectilinearly reciprocated on the fixed frame 110 easily.

The fourth vertical member 123 may be disposed so as to face the third vertical member 122 while being spaced apart from the third vertical member 122 by a predetermined distance. The fourth vertical member 123 is also formed along the longitudinal direction of the upper plate member 121.

The fourth vertical member 123 is configured to reinforce the rigidity of the upper plate member 121, and is also configured to provide a space where an auxiliary caster C3 is capable of being rotatably mounted.

The auxiliary caster C3 may be rotatably provided in a space formed between the fourth vertical member 123 and the third vertical member 122, and may be in rolling contact with the upper surface of the floor member 111 of the fixed frame 110.

The auxiliary caster C3 serves to support the upper plate member 121 on the floor member 111, and also serves to help a sliding movement of the upper plate member 121 smoothly.

As illustrated in FIG. 2, the auxiliary caster C3 is rotatably mounted between the third vertical member 122 and the fourth vertical member 123 while being in a state in which the auxiliary caster C3 is not contact with the upper plate member 121. Therefore, in order to prevent the upper plate member 121 from interfering with a rotational force the auxiliary caster C3, an opening portion is formed in a part of the upper plate member 121 corresponding to a position where the auxiliary caster C3 is mounted.

The guide member 124 also serves to reinforce rigidity of the upper plate member 121, and serves to prevent the upper plate member 121 from being moved in left and right directions when the upper plate member 121 is slidably moved. The guide member 124 may be provided along the longitudinal direction of the upper plate member 121. Meanwhile, as illustrated in FIG. 3, a pair of guide casters C4 spaced apart from each other by a predetermined distance may be disposed in a space formed between the pair of second vertical members 113, and the guide casters C4 may be in rolling contact with guide surfaces that protrude laterally from a lower end portion of the guide member 124.

The guide caster C4 is rotatably mounted while having a horizontal posture with respect to the upper surface of the floor member 111.

Therefore, since the guide member 124 is rectilinearly moved while being guided by the pair of guide casters C4, a situation in which the movable frame 120 is moved in the left and right directions while the movable frame 120 is slidably moved on the fixed frame 110 may be prevented. That is, a force in the left and right directions generated on the movable frame 120 may be offset by the guide member 124 and the pair of guide casters C4.

The guide caster C4 may include a plurality of guide casters C4 on the floor member 111 of the fixed frame 110. For example, as illustrated in FIG. 4, the guide casters C4 may be mounted on a first end part and a middle part in the longitudinal direction of the floor member 111.

The stopper 200 is configured to limit a maximum withdrawal distance of the movable frame 120, and is also configured to prevent the left and right movements of the movable frame 120 by cooperating with the guide long holes 121a formed in the upper plate member 121 during a process in which the movable frame 120 is slidably moved in a rectilinear direction.

The stopper 200 may include: a plate 210 mounted on a bottom surface of the floor member 111; an insertion member 220 which is integrally connected to the plate 210 and which protrudes upward from an upper surface of the plate 210, the insertion member 220 being inserted into the guide long hole 121a; and a buffer member 230 having a through-hole 231 into which the insertion member 200 is capable of being inserted, the buffer member 230 surrounding a circumferential portion of the insertion member 220.

As illustrated in FIG. 7, the plate 210 may be mounted on the bottom surface of the floor member 111. At this time, the plate 210 may be mounted on the bottom surface of the floor member 111 while blocking any one of a plurality of opening portions 111a among the plurality of opening portions 111a formed to be spaced apart from each other by a predetermined distance along the longitudinal direction of the floor member 111.

The insertion member 220 may be inserted into the guide long hole 121a formed in the upper plate member 121. At this time, the upper end portion of the insertion member 220 is partially exposed to the upper portion of the upper plate member 121 via the guide long hole 121a.

The buffer member 230 may be manufactured from rubber material having an elastic restoring force, and the through-hole 231 into which the insertion member 220 is capable of being inserted in a forcibly fitting manner is formed in the center of the buffer member 230.

In addition, a separation prevention member 221 configured to prevent the buffer member 230 from being separated is provided on an upper end of the insertion member 220.

As described above, the stopper 200 described above serves to limit the maximum movement distance of the movable frame 120, and also serves to relieve a shock that occurs during a process in which the movable frame 120 is slidably moved and then stopped.

As illustrated in FIG. 2, when the movable frame 120 is slidably moved in a first direction on the fixed frame 110 so as to withdraw the storage portion, a second end side in a longitudinal direction of the guide long hole 121a may be in contact with a second side of the buffer member 230 of the stopper 200. Then, the sliding movement of the movable frame 120 may be limited. In addition, a moment when the buffer member 230 is in contact with the second end side in the longitudinal direction of the guide long hole 121a may be referred to as a state in which the movable frame 120 is maximally withdrawn on the fixed frame 110.

Conversely, when the movable frame 120 that is withdrawn is slidably moved in a second direction in order to return the storage portion to an original state, a first end side in the longitudinal direction of the guide long hole 121a may be in contact with a first side of the buffer member 230 of the stopper 200 as illustrated in FIG. 1. Then, a storage space of the storage portion and the movable frame 120 are not exposed to the outside.

As described above, the stopper 200 may limit the maximum movement distance of the movable frame 120, and may relieve a shock that occurs in the process. In addition, since the stopper 200 is in a state in which the stopper 200 is inserted into the guide long hole 121a, a situation in which the movable frame is shaken in the left and right directions in the process of rectilinearly reciprocating the movable frame 120 may be prevented by the stopper 200. That is, even when a force in the left and right directions is generated on the movable frame 120, an inner side portion of the guide long hole 121a of the upper plate member 121 is in contact with the buffer member 230 of the stopper 200, so that the left and right movements of the movable frame 120 may be prevented.

Meanwhile, the maximum movement distance of the movable frame 120 may be set by changing a position of the stopper 200 mounted on the fixed frame 110. That is, among the plurality of opening portions 111a provided in the floor member 111, the stopper 200 may be optionally mounted on any one opening portion 111a, so that the maximum movement distance (the withdrawal distance of the storage portion) of the movable frame 120 may be set. For reference, the maximum movement distance of the movable frame 120 (the withdrawal distance of the storage portion) may be set in consideration of a volume of the storage portion, the vehicle interior space, and a mounting position of the fixed frame 110.

For example, when the stopper 200 is mounted on the opening portion 111a formed in a second end side in the longitudinal direction of the floor member 111, the maximum movement distance of the movable frame 120 becomes the shortest. Conversely, as illustrated in FIG. 2 and FIG. 7, when the stopper 200 is mounted on the opening portion 111a formed in a first end side in the longitudinal direction of the floor member 111, the maximum movement distance of the movable frame 120 may become the longest.

Hereinafter, a sliding transport apparatus of a storage portion for a vehicle according to another embodiment of the present disclosure will be described in detail with reference to FIGS. 8 to 11. In a description of the present disclosure, a detailed description of the related known functions or structural configurations will be omitted to avoid making the essence of the present disclosure unclear.

Figure 8:
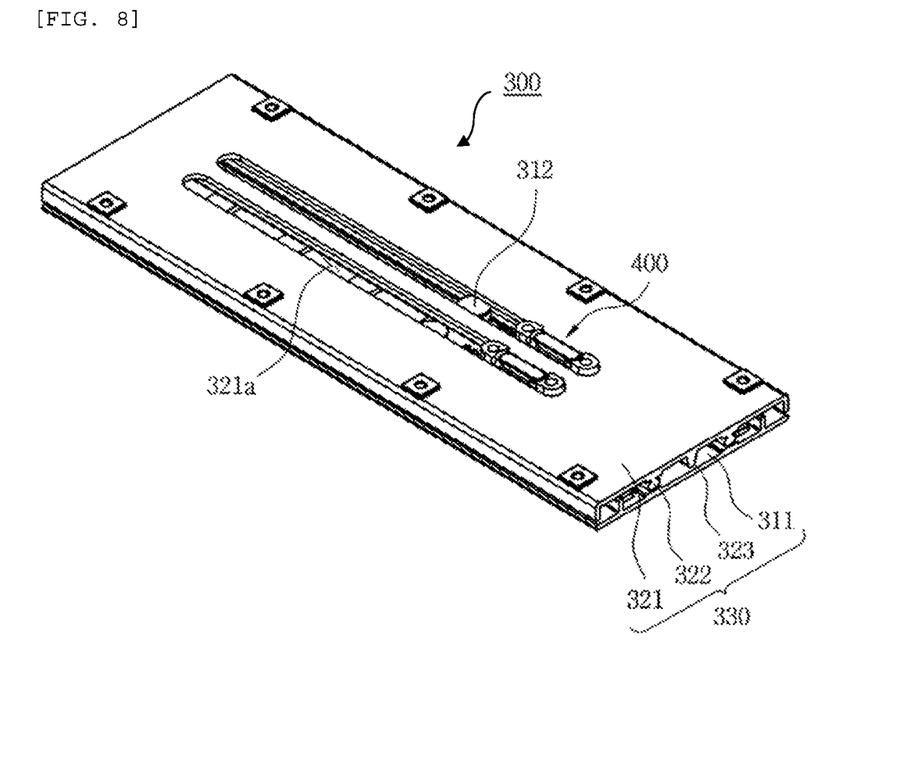
FIG. 8 is a perspective view illustrating the sliding transport apparatus of the storage portion for the vehicle according to another embodiment of the present disclosure.
Figure 9:
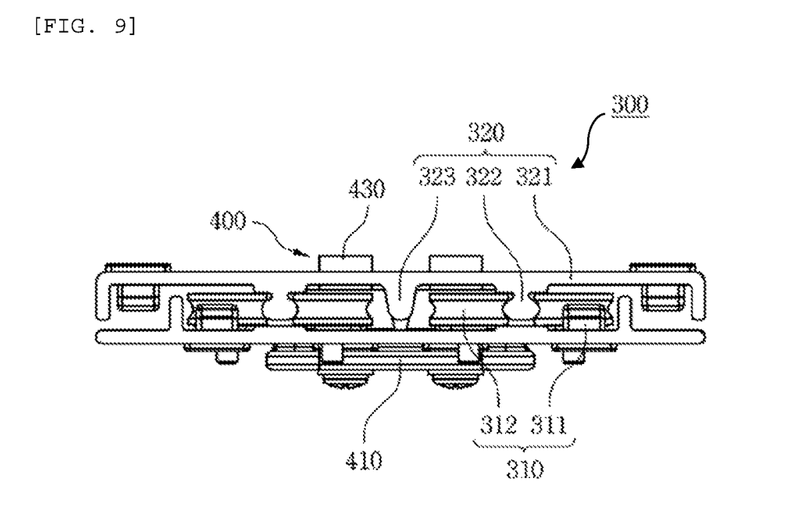
FIG. 9 is a front view illustrating the sliding transport apparatus of the storage portion for the vehicle illustrated in FIG. 8.
Figure 10:
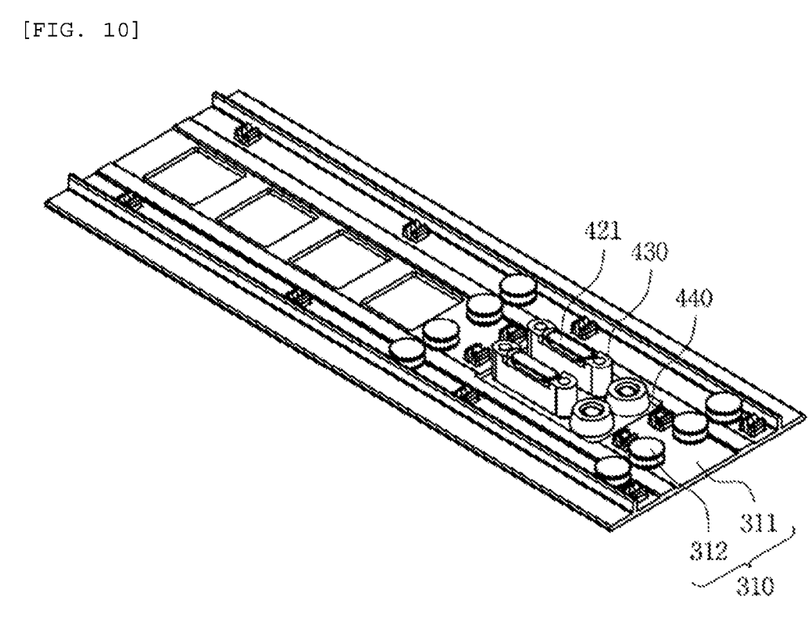
FIG. 10 is a perspective view illustrating a structural configuration of the fixed frame according to another embodiment of the present disclosure.
Figure 11:
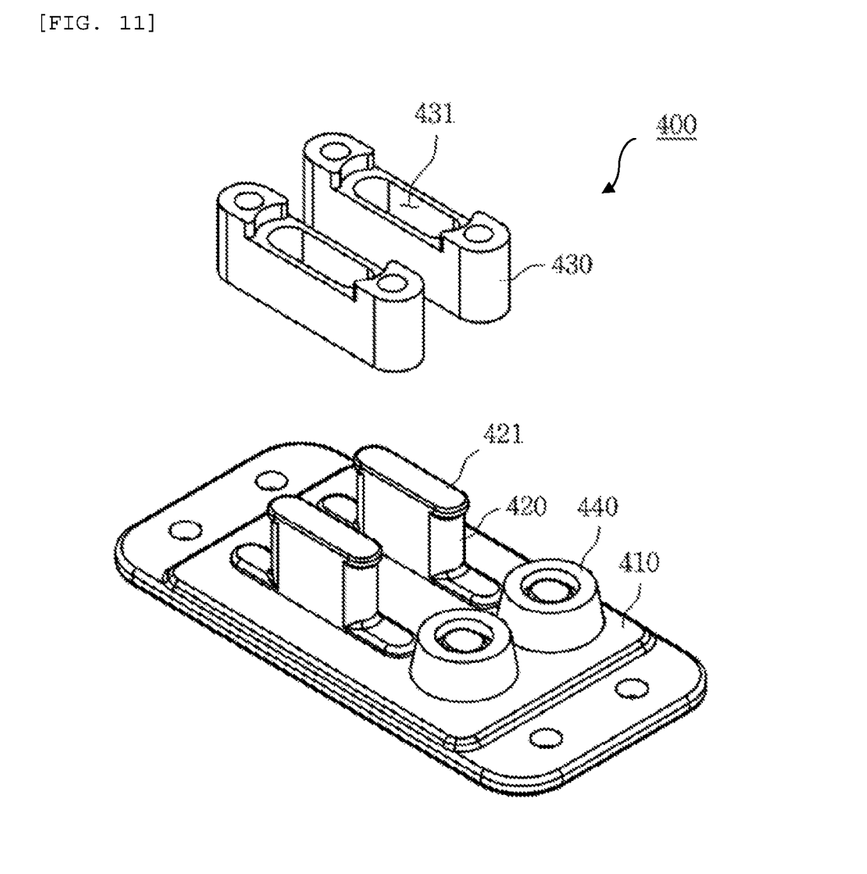
FIG. 11 is an exploded perspective view illustrating the stopper according to another embodiment of the present disclosure.

FIG. 8 is a perspective view illustrating the sliding transport apparatus of the storage portion for the vehicle according to another embodiment of the present disclosure, FIG. 9 is a front view illustrating the sliding transport apparatus of the storage portion for the vehicle illustrated in FIG. 8, FIG. 10 is a perspective view illustrating a structural configuration of the fixed frame according to another embodiment of the present disclosure, and FIG. 11 is an exploded perspective view illustrating the stopper according to another embodiment of the present disclosure.

As illustrated in FIG. 8 and FIG. 9, a sliding transport apparatus 300 of a storage portion for a vehicle according to another embodiment of the present disclosure may include: a fixed frame 310 provided such that the fixed frame 310 is stationary in a vehicle interior space; a movable frame 320 disposed on an upper portion of the fixed frame 310 and configured to be movable along a longitudinal direction of the fixed frame 310, the movable frame 320 having an upper portion on which the storage portion (not illustrated) is mounted; and a stopper 400 provided detachably on the fixed frame 310, the stopper 400 being inserted into a guide long hole 321a formed in the movable frame 320, thereby limiting a movement distance of the movable frame 320.

Since the sliding transport device 300 of the storage portion for the vehicle according to another embodiment may include a similar structural configuration comparing to the sliding transport device 100 for the vehicle according to an embodiment of the present disclosure. For brevity, only different structural configurations will be mainly described hereinafter.

The fixed frame 310 may include: a floor member 311 provided such that the floor member 311 is stationary in the vehicle interior space; and a plurality of guide casters 312 rotatably mounted on shafts that are mounted in a vertical direction to the floor member 311, the plurality of guide casters 312 being in rolling contact with the movable frame 320.

As illustrated in FIG. 9 and FIG. 10, the plurality of guide casters 312 provided on the floor member 311 may be disposed such that rolling contact surfaces of the plurality of guide casters 312 in contact with the movable frame 320 the cloud contact surface in contact with the movable frame 320 face a lateral direction.

In another embodiment of the present disclosure, it is illustrated in drawings that four sets of pair of guide casters 312 spaced apart from each other by a predetermined distance on an upper surface of the floor member 311 are provided, but there is no limitation. For example, at least four sets of the pair of guide casters 312 may be provided on the floor member 311. Furthermore, the pair of guide casters 312 are not limited to being mounted on the first end side and the middle end side in a longitudinal direction of the floor member 311, and are capable of being rotatably mounted on the second end side in the longitudinal direction of the floor member 311.

The movable frame 320 may include: an upper plate member 321 on which the storage portion is mounted and in which the guide long hole 321a is formed; and a first contact member 322 that protrudes vertically downward from a bottom portion of the upper plate member 321, the first contact member 322 being in rolling contact with the guide caster 312 provided on the floor member 311.

The first contact member 322 may be formed along a longitudinal direction of the upper plate member 321, and may be in rolling contact with the guide casters 312 by being disposed between the pair of guide casters 312 provided on the floor member 311 as illustrated in FIG. 9. In addition, a contact protrusion in contact with the rolling contact surfaces of the guide casters 312 is formed at a lower end of the first contact member 322.

Therefore, by a connection structure between the first contact member 322 and the guide casters 312, the upper plate member 321 of the movable frame 320 is capable of being slidably moved in a rectilinear direction on the floor member 311 of the fixed frame 310, and left and right direction movements may be prevented during the moving process.

Meanwhile, as illustrated in FIG. 9, the movable frame 320 may further include a second contact member 323. The second contact member 323 protrudes vertically downward from the center of the bottom surface of the floor member 311, and may be in rolling contact with an auxiliary caster 440 provided on the stopper 400 that will be described later.

The second contact member 323 serves to reinforce the rigidity of the upper plate member 321, and serves to prevent the upper plate member 321 from being moved in left and right directions when the upper plate member 121 is slidably moved. That is, since the second contact member 323 is slidably moved while being in contact with a pair of auxiliary casters 440 provided on the stopper 400, left and right movements of the upper plate member 321 may be prevented.

As illustrated in FIG. 11, the stopper 400 may include: a plate 410 mounted on the bottom surface of the floor member 311; an insertion member 420 which is integrally connected to the plate 410 and which protrudes upward from an upper surface of the plate 410, the insertion member 420 being inserted into the guide long hole 321a; a buffer member 430 having a through-hole 431 into which the insertion member 420 is capable of being inserted, the buffer member 430 surrounding a circumferential portion of the insertion member 420; and the pair of auxiliary casters 440 spaced apart from each other by a predetermined distance and rotatably mounted on the upper surface of the plate 410.

Since the plate 410, the insertion member 420, and the buffer member 430 have structural configurations same as the structural configurations as described in an embodiment of the present disclosure, the detailed description of the structural configuration will be omitted.

The pair of auxiliary casters 440 may be manufactured from rubber material or urethane material, and may be in rolling contact with a first side surface or a second side surface of the second contact member 323 that protrudes from the bottom surface of the upper plate member 321. The pair of auxiliary casters 440 is not limited to serving as guides, and also serves to control an operation force of the movable frame 320.

In the sliding transport apparatus 300 of the storage portion for the vehicle according to another embodiment of the present disclosure, since a structural configuration in which the movable frame 320 is supported and is capable of being slidably moved in a rectilinear direction by using the plurality of guide casters 312 which is mounted on the upper surface of the floor member 311 and which is in a laid-down state is provided, a manufacturing cost may be reduced by lowering an overall height of the fixed frame 310 and the movable frame 320 comparing to the sliding transport apparatus 100 of the storage portion for the vehicle according to an embodiment of the present disclosure in which the plurality of casters erected in the vertical direction. Particularly, during a process in which the movable frame 320 is slidably moved in the rectilinear direction, since a movement generated in up and down directions may be relatively reduced, there is an advantage that the movable frame 320 is capable of being stably moved even when the number of casters is reduced.

Although detailed exemplary embodiments according to the present disclosure have been described so far, obviously, various modifications may be made without departing from the scope of the present disclosure.

Therefore, the scope of the present disclosure should not be limited to the above embodiments, and should be determined not only by the scope of the claims to be described later, but also by the scope and equivalents of the claims.

The present disclosure may be applied and sold in the automotive industry.

The invention claimed is:

1. A sliding transport apparatus for a storage portion of a vehicle, the sliding transport apparatus comprising:
    a fixed frame provided such that the fixed frame is stationary in a vehicle interior space;
    a movable frame configured to be movable along a longitudinal direction of the fixed frame while being accommodated in an inner side space formed by the fixed frame, the movable frame having an upper portion on which the storage portion is mounted; and
    a stopper provided detachably on the fixed frame, the stopper being inserted into a guide long hole formed in the movable frame, thereby limiting a movement distance of the movable frame, wherein the fixed frame comprises:
    a floor member provided such that the floor member is stationary in the vehicle interior space;
    a first vertical member that protrudes vertically upward from opposite sides in a width direction of the floor member, the first vertical member having a rail groove in which a first caster provided on the movable frame is capable of being accommodated; and
    a second vertical member comprising a pair of second vertical members which is disposed to be spaced apart from each other by a predetermined distance and which protrudes vertically upward on an upper surface of the floor member, the second vertical member on which a second caster in rolling contact with a bottom portion of the movable frame is rotatably provided.

2. The sliding transport apparatus of claim 1, wherein the movable frame comprises:
    an upper plate member on which the storage portion is mounted and in which the guide long hole is formed;
    a third vertical member which protrudes vertically downward from opposite sides in a width direction of the upper plate member and which is disposed so as to face the first vertical member, the third vertical member on which the first caster capable of being moved along the rail groove is mounted;
    a fourth vertical member which protrudes vertically downward from a bottom portion of the upper plate member and which is disposed between the third vertical member and the second vertical member; and
    a guide member which protrudes vertically downward from a center of the bottom portion of the upper plate member and which is disposed between the pair of second vertical members.

3. The sliding transport apparatus of claim 2, further comprising an auxiliary caster rotatably provided in a space formed between the third vertical member and the fourth vertical member, the auxiliary caster being in rolling contact with the upper surface of the floor member of the fixed frame.

4. The sliding transport apparatus of claim 2, wherein a pair of guide casters is disposed between a space formed between the pair of second vertical members, and the pair of guide casters is in rolling contact with guide surfaces that protrude laterally from a lower end portion of the guide member.

5. The sliding transport apparatus of claim 1, wherein the stopper comprises:
    a plate mounted on a bottom surface of the floor member;
    an insertion member that protrudes upward from an upper surface of the plate, the insertion member being inserted into the guide long hole; and
    a buffer member having a through-hole into which the insertion member is capable of being inserted, the buffer member surrounding a circumferential portion of the insertion member.

6. The sliding transport apparatus of claim 5, wherein a plurality of opening portions disposed so as to be spaced apart from each other by a predetermined distance is formed in the floor member along a longitudinal direction of the floor member, and the plate of the stopper is provided on the floor member while blocking any one of the plurality of opening portions among the plurality of opening portions.

* * * * *